United States Patent

[11] 3,614,757

[72] Inventor Robert P. Burr
    Lloyd Harbor, N.Y.
[21] Appl. No. 536,541
[22] Filed Mar. 4, 1966
[45] Patented Oct. 19, 1971
[73] Assignee Photocircuits Corporation
    Glen Cove, N.Y.
    Continuation of application Ser. No.
    321,511, Nov. 5, 1963, Continuation-in-
    part of application Ser. No. 120,256, June
    28, 1961, now Patent No. 3,182,243.

[54] DISPLACING APPARATUS
    12 Claims, 7 Drawing Figs.
[52] U.S. Cl. .................................................. 340/174.1,
        179/100.2 S, 226/9, 318/327, 318/341, 226/24
[51] Int. Cl. .................................................. H02p 5/06
[50] Field of Search .................................................. 226/9, 10,
        24, 35, 42, 43, 180, 118, 188; 340/174.1;
        242/55.12, 75.44, 75.5, 75.51; 318/327, 341, 314;
        179/100.25

[56] References Cited
UNITED STATES PATENTS

| | | | |
|---|---|---|---|
| 2,866,143 | 12/1958 | Maxwell | 226/188 UX |
| 2,970,238 | 1/1961 | Swiggett | 226/188 UX |
| 3,044,695 | 7/1962 | Burr et al. | 226/9 UX |
| 3,069,666 | 12/1962 | Austin | 226/188 UX |
| 3,105,179 | 9/1963 | Young et al. | 318/6 |
| 3,109,131 | 10/1963 | Byrd | 318/138 |
| 3,122,052 | 11/1963 | Johnson | 226/42 |
| 3,115,314 | 12/1963 | Manley et al. | 226/176-X |
| 3,182,243 | 5/1965 | Burr | 226/9 UX |
| 3,185,364 | 5/1965 | Kleist | 226/24 |

Primary Examiner—Benjamin Dobeck
Attorney—Morgan, Finnegan, Durham & Pine

ABSTRACT: Apparatus for advancing magnetic tape with respect to a recording head through small, discrete, and uniform displacement increments. A direct current drive motor has an armature shaft that drives a displaceable member. Controls develop signals that energize and deenergize the motor. Included in these controls are a speed responsive tachometer and an acceleration control utilizing a saturable amplifier.

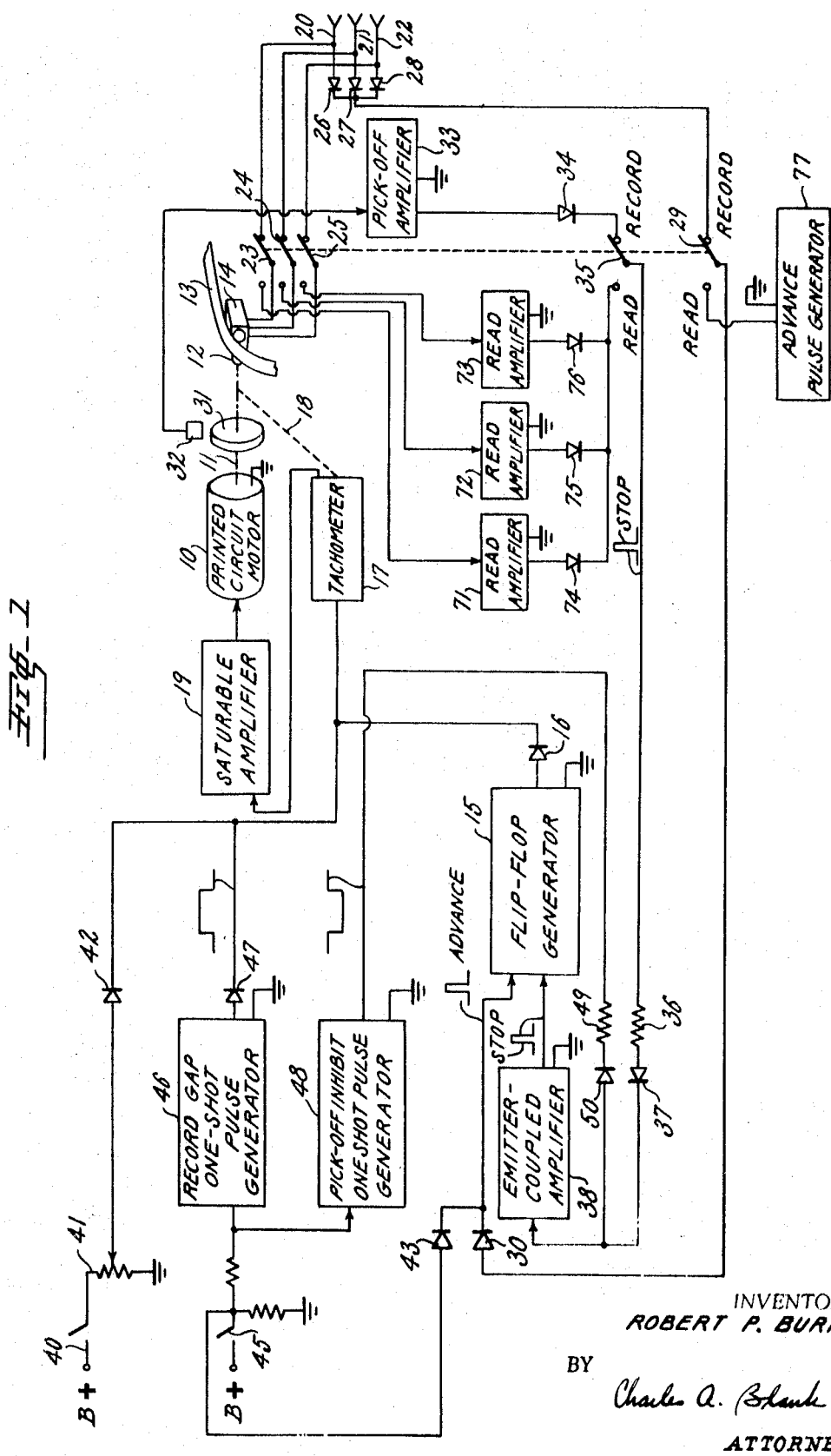

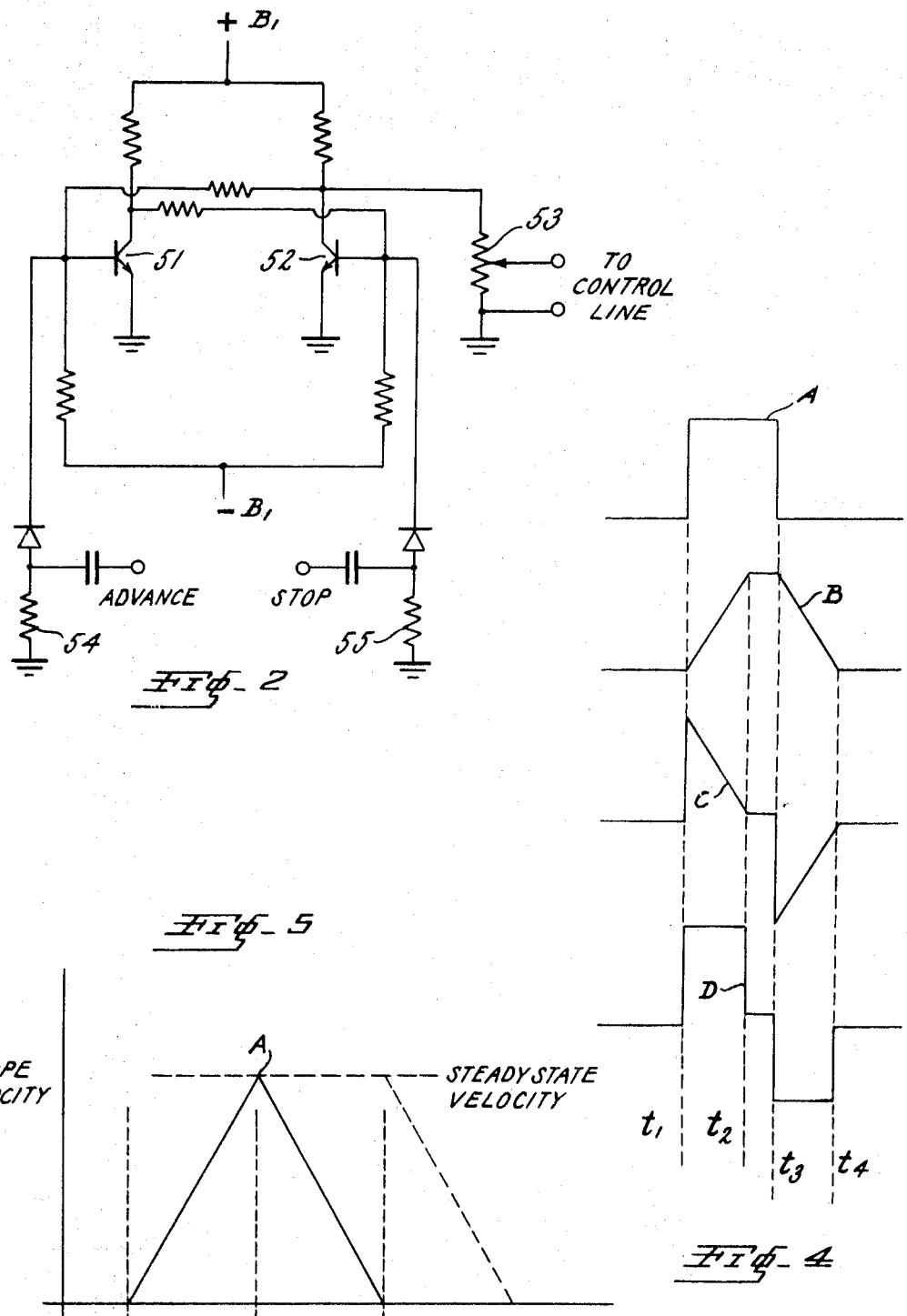

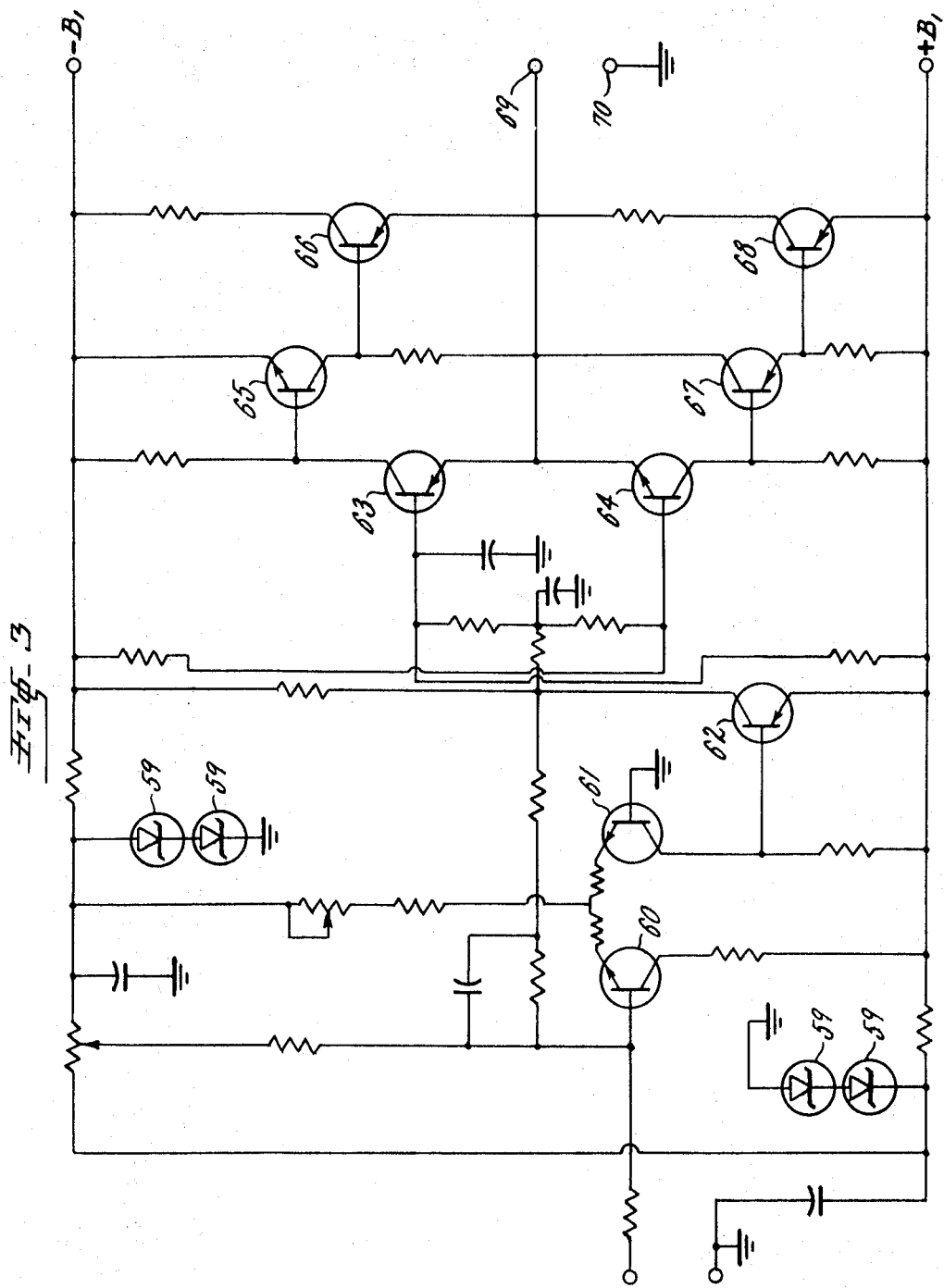

DISPLACING APPARATUS

This application is a continuation of application Ser. No. 321,511 filed Nov. 5, 1963, in the name of Robert P. Burr which in turn is a continuation-in-part of application Ser. No. 120,256 filed June 28, 1961, (now Pat. No. 3,182,243) in the name of Robert P. Burr. The latter application refers to application Ser. No. 12,411 filed Mar. 2, 1960, (now Pat. No. 3,044,695) which is incorporated herein by reference.

This invention relates to apparatus for precisely displacing a member having indicia thereon and, more particularly, to apparatus for precisely displacing magnetic tape having discrete indicia recorded thereon, on a character-by-character or line-by-line basis during both the recording and reading operations.

Recording and reading of magnetic tape with digital information thereon on a line-by-line basis is desirable for many applications. For example, it may be desired to accumulate data from automatic processes, navigational equipment or telemetering apparatus for subsequent high speed use by a computer. Heretofore, while various apparatus has been provided for recording pulse data on a magnetic tape at a slow rate, it has not been possible to read the data from the tape on a line-by-line basis at a slow and perhaps random rate. Thus, information from a magnetic tape has previously been stored in an intermediate buffer stage after reading on a slewing or high-speed basis, and thereafter the information has been utilized upon controlled discharge from the buffer.

Ordinarily, when recording data in the form of pulse indicia on a magnetic tape on a line-by-line basis, the data is recorded on the tape at uniformly spaced intervals. The tape is periodically advanced as rapidly as possible between groups of characters or lines to generate record gaps whenever the incoming data indicates that it will be necessary for the reading transport to stop and start.

The motion of the tape between characters or lines may be, for example, 0.005 inch ± 0.0005 inch or 0.0018 inch ± 0.00018 inch, corresponding to 200 or 556 characters per inch. Displacement of the tape during record gaps may be, for example, 0.75 inch − 1/16 inch +⅛ inch.

Movement of the tape for the data increments may theoretically be obtained by a stepping motor and gear reduction system connected to a tape-drive capstan. However, movement for record gaps with such a system may require the use of an auxiliary capstan motor to advance the tape through the gap interval.

Reading magnetic tape on a line-by-line basis presents particular difficulty because the tape has no mechanical sprocket means and because there is no way to ascertain where the data is physically located on the tape without actually reading the tape.

Detenting devices such as stepping motors are not practical for reading magnetic tapes since there is no way to obtain and maintain registration between the data on the tape and the capstan motion.

It is an object of the present invention, therefore, to provide a new and improved apparatus for precisely displacing a member having discrete indicia thereon on a line-by-line basis.

It is another object of the invention to provide new and improved apparatus for advancing magnetic tape with respect to a recording head through small, discrete, and uniform displacement increments which are repeatable with high accuracy for the purpose of preparing magnetic recordings on the tape on a line-by-line basis.

It is another object of the invention to provide apparatus for translating magnetic tape with respect to a magnetic head at high rates of speed for short, accurately determined displacements in order to generate record gaps when recording in a line-by-line manner.

The invention also has utility in recording and reading indicia on tapes other than magnetic tape, for example, perforations of a perforated paper tape.

In accordance with the invention, apparatus for precisely displacing a member having indicia thereon comprises a direct-current drive motor having an armature with a substantially uniformly distributed winding and having an armature shaft adapted to drive the displaceable member. The apparatus also includes control means for developing a signal for controlling the times of energization and deenergization of the motor. The apparatus also includes speed-responsive means coupled to the armature shaft for developing a direct-current signal representative of the speed of the armature shaft. The control means and the speed-responsive means are coupled to provide a signal representative of the difference between the signal developed by the control means and the signal developed by the speed-responsive means. The apparatus also includes saturable amplifier means responsive to the difference signal and coupled to the motor for providing a signal for accelerating the motor to a desired velocity in a predetermined transient starting interval and for precisely controlling the deceleration and thus the displacement of the armature shaft during the transient stopping interval.

For a better understanding of the present invention, together with other and further objects thereof, reference is made to the following description taken in connection with the accompanying drawings, and its scope will be pointed out in the appended claims.

Referring now to the drawings:

FIG. 1 is a schematic block diagram of pulse indicia recording and reading apparatus including displacing apparatus constructed in accordance with the invention;

FIG. 2 is a circuit diagram of a flip-flop generator utilized in the FIG. 1 apparatus;

FIG. 3 is a circuit diagram of a saturable servoamplifier suitable for use in the FIG. 1 apparatus;

FIG. 4 is a graph representing the signal-time characteristics at various points in the FIG. 1 apparatus;

FIG. 5 is a graph representing velocity-time characteristics of the magnetic tape under various operating conditions;

Figure 6:
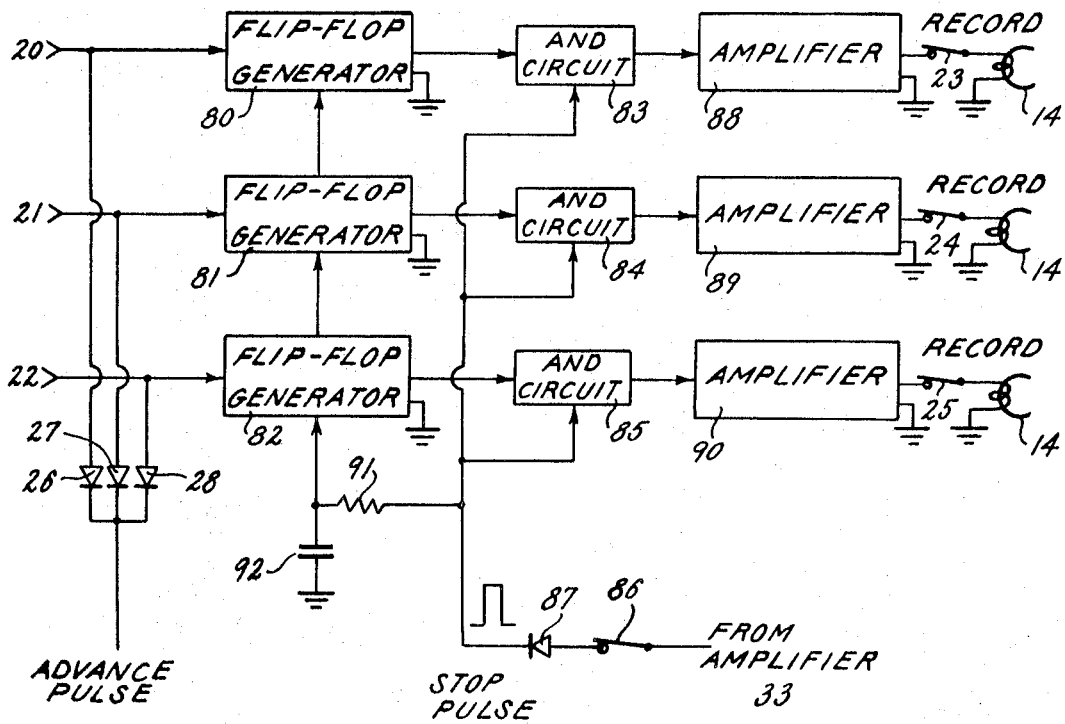
FIG. 6 is a schematic block diagram of modified apparatus useful in connection with the FIG. 1 apparatus and constructed in accordance with the invention.

Referring now more particularly to FIG. 1 of the drawings, there is represented apparatus for recording digital information or pulse indicia on magnetic tape and for reading magnetic tape having indicia recorded thereon. For purposes of explanation, the indicia recorded on the tape will be considered to be in ordinary pulse form, but it will be apparent that each of the indicia may also be recorded in the form of a transition of magnetic state of the tape from one level to another, as in so-called non return to zero recording. The FIG. 1 apparatus includes displacing apparatus for precisely displacing the tape having discrete indicia thereon. The displacing apparatus comprises a direct-current drive motor having an armature with a substantially uniformly distributed winding and having an armature shaft adapted to drive the tape. More particularly, the motor preferably is a printed circuit motor which may be of the type described in Swiggett Pat. No. 2,970,238. Such a printed circuit motor has an iron-free armature disc with low inertia and with no preferred armature positions. The motor 10 has an armature shaft, diagrammatically represented by a broken line 11, having thereon a capstan 12 for driving magnetic tape 13 across recording and reading heads 14.

The displacing apparatus also includes control means for developing a signal for controlling the times of energization and deenergization of the motor and for controlling the terminal velocity of the motor. More particularly, this control means comprises a flip-flop generator 15 described in greater detail hereinafter. The output circuit of the flip-flop generator 15 is coupled through a suitable OR gate 16 to speed-responsive means comprising a tachometer 17 of conventional construction coupled to the armature shaft, as indicated by broken line 18, for developing a direct-current signal representative of the speed of the armature shaft. The energizing means comprising the flip-flop generator 15 and the speed-responsive means comprising the tachometer 17 are coupled to provide a signal representative of the difference between the signal developed by the energizing means and the signal developed by the speed-responsive means. The output circuit of the tachometer preferably is coupled in series relation with the output circuit of the flip-flop generator 15 to provide the aforesaid difference signal.

The displacing apparatus also includes saturable amplifier means responsive to the aforesaid difference signal and coupled to the motor for providing a signal for accelerating the motor to a desired velocity in a predetermined transient starting interval and for precisely controlling the deceleration and thus the displacement of the armature shaft during the transient stopping interval. The saturable amplifier means, more fully described hereinafter, provides signals of substantially constant amplitudes during transient starting and stopping intervals for driving the motor with substantially constant acceleration to a desired substantially constant velocity and for stopping the motor with substantially constant deceleration.

The FIG. 1 apparatus also includes circuits for supplying digital information to be recorded to the recording head 14. For example, three channels 20, 21, 22 are represented as being coupled through a switch having sections 23, 24, 25 to the head 14. The recording channels 20, 21, 22 are also coupled through suitable OR gates 26, 27, 28 and a switch 29 coupled to the earlier mentioned switch sections 23, 24, 25 and to an OR gate 30 to the flip-flop generator 15 for supplying advance pulses to actuate the flip-flop generator.

There is also directly mounted on the shaft 11 of the motor 10, a circular disc 31 having a magnetic record along the circumference thereof with pulses at discrete increments representing the desired spacings between pulses to be recorded on the magnetic tape. A suitable pickoff head 32 responsive to the pulses on the disc 31 is coupled through a pickoff amplifier 33 and an OR gate 34 through a switch section 35, a logic section 36, 37, and an emitter-coupled amplifier 38 to provide stop pulses for the deactuation of the flip-flop generator 15.

The apparatus also includes a suitable slewing switch 40 connecting a suitable voltage source +B to a voltage divider 41. The voltage divider 41 is coupled through an OR gate 42 to the tachometer 17.

The FIG. 1 apparatus also includes a gap-generating pushbutton switch 45 coupled to a suitable voltage source +B and to the input circuit of a record gap one-shot pulse generator 46, which may be of conventional one-shot pulse generator construction, having an output circuit coupled through an OR gate 47 to the tachometer 17. A pickoff inhibit one-shot pulse generator 48, which may be of conventional one-shot pulse generator construction, is also connected to the gap generating switch 45 and has its output circuit connected through an inhibit logic section 49, 50 to the input circuit of the emitter-coupled amplifier 38 for preventing the generation of stop pulses in the output circuit of the amplifier 38 during the period of the one-shot pulse generated by the generator 48. The gap-generating switch 45 is also connected through an OR gate 43 to the flip-flop generator 15 to provide a continuous voltage level input to the generator 15 corresponding to the amplitude of an advance pulse during the gap-generating operation.

The FIG. 1 apparatus also includes read amplifiers 71, 72, 73 coupled through switch sections 23, 24, 25, respectively, to the head 14 during the reading operation. Suitable OR gate diodes 74, 75, 76 coupled to the amplifiers 71, 72, 73, respectively, are utilized to apply a pulse representing each line read through switch 35 and the logic section 36, 37, to the emitter-coupled amplifier 38.

The FIG. 1 apparatus also includes a suitable advance pulse generator 77 coupled through switch 29 to diode 30 for using during the reading operation.

Prior to considering the operation of the FIG. 1 apparatus, reference will be made to FIG. 2 which represents in detail the circuit of the flip-flop generator 15, which may be of conventional construction. The circuit comprises a pair of, for example, NPN transistors 51, 52 intercoupled in a conventional manner to provide a bistable circuit. This circuit maybe triggered by, for example, either a positive input advance pulse or a positive input stop pulse to shift the voltage level developed across an output potentiometer 53 from, for example, zero volts to a desired positive voltage and vice versa.

Referring for the moment to FIG. 3, there is represented a saturable servoamplifier suitable for use as the saturable amplifier 19. The amplifier 19 may utilize Zener diodes 59 for voltage-regulating purposes. The saturable amplifier includes an NPN input transistor 60 coupled to a second NPN transistor 61 having its collector output circuit coupled to a PNP transistor 62. The remainder of the circuit is ordinarily in a balanced condition, developing no output signal when there is no applied input signal. The collector of the transistor 62 is coupled to the base inputs of transistors 63, 64. The collector of transistor 63 is coupled to transistor 65 which, in turn, is coupled to transistor 66. The impedance of the motor 10 across terminals 69, 70 is effectively connected to the emitter of the transistor 66. In a symmetrical manner, the collector of transistor 64 is coupled to transistor 67 having its emitter coupled to transistor 68. The impedance of the motor 10 is effectively connected in the collector circuit of transistor 68.

When an input signal is applied and the current flow through transistors 63, 65, 66 is unbalanced with respect to current flow through transistors 64, 67 and 68, an output signal is developed. For example, if a positive input signal is applied to the base of transistor 60, transistor 66 is driven towards saturation while transistor 68 is driven to a low conduction level, and a positive output signal is developed at the output terminal 70 with respect to terminal 69.

An analogous operation occurs when the input signal is negative, with transistor 68 being driven to saturation and the terminal 70 being negative with respect to the terminal 69.

Considering now the operation of the FIG. 1 apparatus during the recording operation, pulses to be recorded on the magnetic tape are transmitted through channels 20, 21, 22 and switch sections 23, 24, 25 to the head 14 for developing pulses across the width of the tape to form a character or line. While three channels have been represented as an example, ordinarily a greater number of channels would be utilized to form a line. During the recording operation, the input pulses are also translated through the OR gate diodes 26, 27, 28, the switch 29 and the OR gate diode 30 to the advance input circuit of the flip-flop generator 15, causing the flip-flop generator to develop a positive output voltage level, represented at time $t_1$, by curve A of FIG. 4, which is the signal translated through the OR gate diode 16 to the tachometer 17. The voltage developed by the tachometer is proportional to the velocity of the tachometer and thus, to the velocity of motor and tape. The voltage developed by the tachometer at time $t_1$, is zero, as represented by curve B of FIG. 4, and the difference voltage between the level represented by curve A at time $t_1$ and curve B at time $t_1$ is applied to the saturable amplifier 19. This difference signal is represented by curve C of FIG. 4.

The saturable amplifier amplifies the difference signal represented by curve C to provide at terminal 70 with respect to terminal 69 an output signal represented by curve D for application to the printed circuit motor 10 to cause the motor immediately to accelerate to a terminal velocity determined by the voltage level supplied from the flip-flop generator 15 of, for example, approximately 3.6 inches per second in a period of, for example, approximately 1.2 milliseconds, represented by interval $t_1-t_2$ of FIG. 4.

While the tape is stationary and just beginning to accelerate, the input pulse having a duration of, for example, one-tenth millisecond, is recorded on the tape. After a displacement of, for example, approximately 0.0025 inch has been traversed by the tape and also shortly after the motor has reached its terminal velocity of 3.6 inches per second at time $t_2$ of FIG. 6, the pickoff head 32 develops an output pulse from the prerecorded spaced pulses on the disc 31. This pulse is amplified in the pickoff amplifier 33 and applied as a stop pulse through the logic section 36, 37 and the emitter-coupled amplifier 38 to the stop input circuit of the flip-flop generator 15, causing the flip-flop generator to reset its output potential at, for example, approximately zero volts. This change in output potential is represented by Curve A of FIG. 4 at time $t_3$. The tachometer output voltage at time $t_3$ is represented by curve B of FIG. 4, and thus the difference signal applied to the saturable amplifier 19 appears, as represented by curve C of FIG. 4, as a negative input signal to the saturable amplifier 19. This input signal is amplified to apply to the motor 10 a negative output signal at the terminal 70 with respect to the terminal 69. The motor then decelerates to zero velocity in a time interval $t_3$-$t_4$ of, for example, approximately 1.2 milliseconds, causing a further tape displacement of, for example, 0.0025 inch. When the next line of pulses to be recorded is applied through channels 20, 21, 22, the cycle is repeated. In this manner, pulses are recorded on the tape at precisely spaced increments.

In order to generate record gaps, the gap control switch 45 may be closed to actuate the flip-flop generator 15 and the one-shot pulse generator 46, developing a positive output pulse from the generator 46 which is applied through OR gate diode 47 in series opposition with the output signal of the tachometer 17 to cause the motor to advance in a manner analogous to that previously described for the operating condition when a positive pulse is applied by the flip-flop generator 15. During the gap generation period, however, a negative pulse is developed by the pickoff inhibit one-shot pulse generator, which is applied through the logic section 49, 50 to the emitter-coupled amplifier 38 to prevent the pulses picked off the disc 31 by the pickoff head 32 from being translated through the emitter-coupled amplifier, and thus to prevent the generation of stop pulses at the flip-flop generator 15.

The output signal of the gap generator 46 may, for example, be a rectangular pulse having a magnitude of 6.3 volts and a duration of, for example, 30 milliseconds. This pulse may, for example, cause the motor to accelerate rapidly to a velocity of, for example, 28 inches per second. The time required to attain this terminal velocity may, for example, be 5 milliseconds. The motor then runs at constant velocity until the pulse from generator 46 is terminated, at which time the motor decelerates towards zero velocity and arrives at a velocity of approximately 3.6 inches per second in another time interval of 5 milliseconds. The gap generation interval is terminated in a manner such that the motor stops in registration with the pulses developed by the pickoff head 32 to prevent improper spacing of subsequent line-by-line records. This is accomplished by the pickoff inhibit one-shot pulse generator 48 which returns to its initial condition 5 milliseconds after the pulse from generator 46 is terminated to allow the motor to decelerate to its normal velocity of 3.6 inches per second at the termination of the gap. When the pulse generated by the pickoff inhibit generator 48 is terminated, the next pulse picked off the disc 31 by the pickoff head 32 is effective as a stop pulse to trigger the flip-flop generator 15 cause the motor 10 to stop so that the registration of the motor is correct. This stopping operation occurs because the flip-flop generator 15 has previously been triggered into its advance condition by the signal applied thereto through OR gate diode 43 when the push button switch 45 was closed at the beginning of the gap generation operation.

Due to the low inertia and substantially uniformly distributed armature winding of the motor, the starting and stopping of the motor may be precisely controlled in the foregoing manner with substantially constant acceleration and deceleration.

As previously discussed, the apparatus is capable of reading the magnetic tape a line at a time, that is, line-by-line. To this end, an advance pulse generator 77 of conventional construction for developing suitable pulses at a desired rate is utilized to supply advance pulses to the flip-flop generator 15. With each advance pulse, the flip-flop generator generates a change of voltage level in a manner analogous to that previously described in connection with the recording operation. This results in the motor accelerating to its terminal velocity in a predetermined time interval, for example, 1.2 milliseconds. When the motor has reached its terminal velocity of 3.6 inches per second the tape is displaced until the head 14 reads the next line of pulses, which is supplied as a stop pulse through switch sections 23, 24, 25 to read amplifiers 71, 72, 73 OR gate diodes 74, 75, 76 and switch 35 to the emitter-coupled amplifier 38. This results in a change in the voltage level of the flip-flop generator 15 analogous to that previously described to cause an immediate deceleration of the motor in a period of, for example, 1.2 milliseconds to zero velocity. Thus, after the line of pulses to be read is reached, the motor travels through a displacement of 0.0025 inch which is precisely controlled. The apparatus is then in condition to repeat the cycle to read the next line of pulses. There is no cumulative error because the motor stops after reading each pulse, and each stop is individually controlled by each line of pulses. The line is read while the motor is traveling at maximum velocity, and as the motor commences its deceleration to zero velocity. The motor comes to a complete stop between lines of pulses in this operating mode. It should be understood that the pulses read may be supplied from the read amplifiers to suitable utilizing apparatus (not shown).

The minimum stable cycle of the apparatus for a selected maximum tape velocity and for an operating mode with a complete stop between lines of pulses is represented diagrammatically in FIG. 5 in solid-line construction. In this operating mode, sufficient time is allowed between starting, stopping and subsequent starting to allow the motor to accelerate from zero velocity to the selected maximum velocity and to allow the motor again to decelerate to zero velocity. The velocity-time characteristics during acceleration and deceleration are substantially linear and are, therefore, precisely controllable. Once the motor has reached its maximum selected steady state velocity, as represented by the broken-line construction of FIG. 5, it may continue at that velocity for any desired period of time, for example, as when a record gap occurs between pulses. The motor thereafter will accurately stop upon the reading of the next pulse without incurring any cumulative error.

It should be understood that the maximum steady state velocity is controllable in accordance with the amplitude of the voltage supplied by the flip-flop generator to the saturable amplifier. That is, the amplitude of signal A of FIG. 5 controls the running velocity of the motor and may be adjusted by adjusting the voltage divider 53 of FIG. 2. As will be more fully explained subsequently, the maximum selected velocity should not exceed the velocity to which the motor can accelerate with a tape displacement no greater than one-half the increment between recorded lines of pulses.

The apparatus may also utilized in a slewing mode by closing slewing switch 40 to apply a positive voltage to the tachometer 17 to cause the motor to run continuously. During slewing operation, the slewing voltage exceeds the output voltage of the flip-flop generator 15.

Apparatus constructed in accordance with the invention may also be operated at high speed in a line-by-line manner without coming to a complete stop during either the recording or reading operations except after the recording and reading of the final line of data. Referring now more particularly to FIG. 6, there is represented modified apparatus suitable for use in a high speed recording operation, without requiring the motor to come to a complete stop between lines of pulses recorded. The apparatus of FIG. 6 may be substituted in the FIG. 1 apparatus for the corresponding data input portion of the FIG. 1 apparatus. The recording channels 20, 21, 22 are coupled through flip-flop generators 80, 81, 82, respectively, to AND circuits 83, 84, 85, respectively. The other input circuits of the AND circuits are coupled to a suitable second output circuit of the pickoff amplifier 33 (FIG. 1) through a switch section 86 and diode 87. The output circuits of the AND circuits are coupled through suitable amplifiers 88, 89, 90 to the recording heads 14 for the individual channels through switch sections 23, 24, 25. Thus, the flip-flop generators, AND circuits and amplifiers are substituted for the direct connections from the input channels 20, 21, 22 to the switch 23, 24, 25. As will be explained, the FIG. 6 apparatus is effective to provide a one-character or one-line storage during the recording operation. In a so-called nonreturn to zero recording apparatus, the amplifiers 88, 89, 90 could be replaced by flip-flop generators.

When pulses arrive through the input channels 20, 21, 22, the pulses are translated through the OR gate diodes 26, 27, 28 to provide an advance pulse in the manner previously described. The pulses are also effective to change the output voltage levels of the respective flip-flop generators 80, 81, 82 which act as storage devices and apply their output voltage levels to the AND circuits 83, 84, 85.

Figure 7:
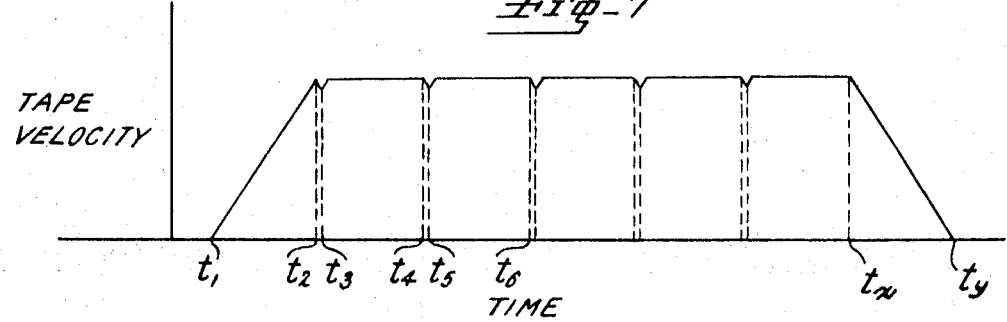
FIG. 7 is a graph representing a velocity-time characteristic of magnetic tape under a selected operating condition of the FIG. 6 apparatus.

Referring for the moment to FIG. 7, the advance pulse corresponding to the arrival of data at time $t$ actuates the flip-flop generator 15, resulting in the acceleration of the motor 10 to a terminal velocity at time $t_2$ determined by the output level of the flip-flop generator 15. At time $t_2$ the pickoff amplifier 32 reads a pulse from the disc 31 and supplies this pulse as a stop pulse through the pickoff amplifier 33 and diode 34 to the logic section 36, 37, as previously described, to initiate the termination of the forward energization of the motor 10, which immediately begins to decelerate. At the same time $t_2$, the stop pulse is applied through switch 86 and diode 87 to the AND circuits 83, 84, 85 and also through a suitable resistor-condenser delay circuit 91, 92 to the flip-flop generators 80, 81, 82 to reset the voltage levels of the flip-flop generators 80, 81, 82. Accordingly, at time $t_2$, pulses corresponding to the input data are transmitted through the AND circuits 83, 84, 85, amplifiers 88, 89, 90 and switches 23, 24, 25 to the corresponding recording heads 14.

During a high speed mode of operation, the next line of input data pulses may arrive at time $t_3$ shortly after the motor begins to decelerate. The next line of pulses will be precisely recorded on the tape with an increment spaced from the first line of pulses as determined by the spacing between the prerecorded pulses on the disc 31 because the recording occurs at the time the pickoff head 32 reads the prerecorded pulses on the disc 31.

The motor continues to rotate at maximum velocity except for a very brief interval of time immediately after the stop pulse and prior to the arrival of the next line of pulses. Accordingly, approximately twice the number of lines of pulses can be recorded in a line-by-line manner in a given period of time because the motor does not completely stop between lines, as compared with the recording operation when the motor comes to a complete stop between lines. After the recording of the final pulse line at time $t_x$, the motor comes to a precisely controlled stop with a precisely controlled deceleration and thus a precisely controlled increment during the time interval $t_x$-$t_y$ in a manner similar to that previously described.

The read portion of the FIG. 1 apparatus may be utilized to read the data in a line-by-line manner without requiring the motor to come to a complete stop between lines of pulses read. Referring again to FIG. 7, if the advance pulses are considered to arrive at times $t_1$, $t$, , $t_5$, the data will be read at times $t_2$, $t_4$, $t_6$ and the velocity-time characteristic of the tape will be as represented in FIG. 7 with each line of pulses read supplying a stop pulse at times $t_2$, $t_4$, $t_6$ in the manner previously described. However, when the motor begins to decelerate, the next advance pulse arrives and the motor then accelerates to terminal velocity. After the final line of pulses is read at time $t_x$, the motor decelerates to a precisely controlled stop in the time interval $t_x$-$t_y$ in a manner corresponding to that previously described. Accordingly in this mode of operation, the pulses may be read in a line-by-line manner in a time interval which is approximately one-half the time interval required if the motor is allowed to come to a complete stop after reading each line.

So long as the maximum velocity selected for the motor operation does not exceed the velocity to which the motor can accelerate with a tape displacement corresponding to one-half the increment between the lines of characters to be recorded, variations in the time of data arrival during the recording operation and variations of the advance command during the reading operation do not affect the accuracy of the increments between recording or reading. This is because during the recording operation, the motor comes to a precisely controlled stop with a displacement accurately measured from the last pulse read by the pickoff head 32 while traversing no more than half of the displacement between characters on the tape. Upon the arrival of the next line of input data pulses, the motor accelerates to its terminal velocity and travels at that velocity until the next stop pulse is read from the pickoff head 32. Accordingly, the recording increments are precisely controlled.

During the reading operation, variations of the advance command may result in causing the motor to come to a precisely controlled stop between lines of pulses read. However, the pulses will be read in a line-by-line manner with the initiation of each stop being individually controlled by each line of pulses.

From the foregoing description, it will be apparent that apparatus constructed in accordance with the invention has several advantages. Data may be recorded at a low and random rate on a magnetic tape and may be read from the tape on a line-by-line basis at a different and perhaps random rate. The apparatus dow not require the use of a storage unit upon reading information form the tape. It is possible to generate record gaps while recording and to read at rates which may be increased continuously to the slewing rate.

While there has been described what is at present believed to be the preferred embodiment of this invention, it will be obvious of those skilled in the art that various changes and modifications may be made therein without departing from the invention, and it is, therefore, aimed to cover all such changes and modifications as fall within the true spirit and scope of the invention.

Having thus described my invention, what I claim and desire to protect by Letters Patent is:

1. Apparatus for precisely displacing a member having indicia thereon comprising:

a direct-current drive motor having an armature with a substantially uniformly distributed winding and having an armature shaft adapted to drive the displaceable member;

control means for developing a signal for controlling the times of energization and deenergization of said motor;

speed-responsive means coupled to said armature shaft for developing a direct-current signal representative of the speed of said armature shaft, said control means and said speed-responsive means being coupled to provide a signal representative of the difference between said signal developed by said control means and said signal developed by said speed-responsive means;

and saturable amplifier means responsive to said difference signal and coupled to said motor for providing a signal for accelerating said motor to a desired velocity in a predetermined transient starting interval and for precisely controlling the deceleration and thus the displacement of said armature shaft during the transient stopping interval.

2. Apparatus for precisely displacing a member having discrete indicia thereon comprising:

a direct-current drive motor having an armature with a substantially uniformly distributed winding and having an armature shaft adapted to drive the displaceable member;

means for supplying pulses to be recorded on said displaceable member;

means coupled to said armature shaft for developing pulses representative of the position of said armature shaft;

means for developing a direct-current signal for energizing said motor to advance said motor in response to said pulses to be recorded, said energizing means also being responsive to said pulses representative of said shaft position for terminating said direct-current signal to stop said motor;

speed-responsive means coupled to said armature shaft for developing a direct-current signal representative of the speed of said armature shaft, said energizing means and said speed-responsive means being coupled to provide a signal representative of the difference between said signal developed by said energizing means and said signal developed by said speed-responsive means;

and saturable amplifier means responsive to said difference signal and coupled to said motor for providing a signal for accelerating said motor to a desired velocity in a predetermined transient starting interval and for precisely controlling the deceleration and thus the displacement of said armature shaft during the transient stopping interval.

3. Apparatus for precisely displacing a member having a discrete indicia thereon comprising:

a direct-current drive motor having an armature with a substantially uniformly distributed winding and having an armature shaft adapted to drive the displaceable member;

control means for developing a direct-current signal for controlling the times of energization and deenergization of said motor and the terminal velocity thereof;

speed-responsive means coupled to said armature shaft for developing a direct-current signal representative of the speed of said armature shaft, said control means and said speed-responsive means being coupled to provide a signal representative of the difference between said signal developed by said control means and said signal developed by said speed-responsive means;

and saturable amplifier means responsive to said difference signal and coupled to said motor for providing signals having substantially constant amplitudes during transient starting and stopping intervals for driving said motor with substantially constant acceleration to a desired substantially constant velocity in a predetermined transient starting interval and for stopping the motor with substantially constant deceleration to control precisely the displacement of said armature shaft during the transient stopping interval.

4. In apparatus for developing pulses representative of the indicia on a displaceable member in response to displacement of the member, apparatus for precisely displacing the member comprising:

a direct-current drive motor having an armature with a substantially uniformly distributed winding and having an armature shaft adapted to drive the displaceable member;

means for developing a direct-current signal for energizing said motor to advance said motor, said energizing means being responsive to pulses derived in the apparatus from said indicia for terminating said direct-current signal;

speed-responsive means coupled to said armature shaft for developing a direct-current signal representative of the speed of said armature shaft, said energizing means and said speed-responsive means being coupled to provide a signal representative of the difference between said signal developed by said energizing means and said signal developed by said speed-responsive means;

and saturable amplifier means responsive to said difference signal and coupled to said motor for providing a signal for accelerating said motor to a desired velocity in a predetermined transient starting interval and for precisely controlling the deceleration and thus the displacement of said armature shaft during the transient stopping interval.

5. In apparatus for reading the indicia on a magnetic tape in response to displacement of the tape, apparatus for precisely displacing the tape in a line-by-line manner comprising:

a direct-current drive motor having a low inertia armature with a substantially uniformly distributed winding and having an armature shaft adapted to drive the tape;

bistable circuit means for developing a direct-current signal for energizing said motor to advance said motor, said energizing means being responsive to pulses derived in the apparatus from said indicia for terminating said direct-current signal to stop said motor;

speed-responsive direct-current tachometer means coupled to said armature shaft for developing a direct-current signal representative of the speed of said armature shaft, said energizing means and said speed-responsive means being coupled to provide a signal representative of the difference between said signal developed by said energizing means and said signal developed by said speed-responsive means;

and saturable bidirectional amplifier means saturable in response to signals of positive and negative polarities and responsive to said difference signal and coupled to said motor for providing a signal for accelerating said motor to a desired velocity in a predetermined transient starting interval and for precisely controlling the deceleration and thus the displacement of said armature shaft during the transient stopping interval.

6. Apparatus for precisely displacing in a line-by-line manner magnetic tape having indicia thereon comprising:

a direct-current drive motor having an armature with a substantially uniformly distributed winding and having an armature shaft adapted to drive the tape;

pickoff means responsive to the indicia on said tape for deriving pulses representative of the indicia;

means for developing a direct-current signal for energizing said motor to advance said motor, said energizing means being coupled to said pickoff means for terminating said direct-current signal to stop said motor in response to said derived pulses;

speed-responsive means coupled to said armature shaft for developing a direct-current signal representative of the speed of said armature shaft, said energizing means and said speed-responsive means being coupled to provide a signal representative of the difference between said signal developed by said energizing means and said signal developed by said speed-responsive means;

and saturable amplifier means responsive to said difference signal and coupled to said motor for providing a signal for accelerating said motor to a desired velocity in a predetermined transient starting interval and for precisely controlling the deceleration and thus the displacement of said armature shaft during the transient stopping interval.

7. In apparatus for recording digital indicia on a magnetic tape in a line-by-line manner, apparatus for displacing the tape with precisely controlled increments between lines of indicia recorded comprising:

a direct-current drive motor having an armature with a substantially uniformly distributed winding and having an armature shaft adapted to drive the tape;

control means for developing a direct-current signal for controlling the times of energization and deenergization of the motor and the terminal velocity thereof;

means coupled to said armature shaft for developing pulses precisely indicating displacement increments of said shaft;

said control means being responsive to individual displacement-indicating pulses for initiating individual deenergizations of said motor;

data-recording means;

data pulse-supply means including means for effectively storing individual lines of data pulses and for translating individual lines of said data pulses to said data-recording means in response to individual displacement-indicating pulses;

speed-responsive means coupled to said armature shaft for developing a direct-current signal representative of the speed of said armature shaft, said control means and said speed-responsive means being coupled to provide a signal representative of the difference between said signal developed by said control means and said signal developed by said speed-responsive means;

and saturable amplifier means responsive to said difference signal and coupled to said motor for providing a signal for accelerating said motor to a desired velocity in a predetermined transient starting interval and for precisely controlling the deceleration and thus the displacement of said armature shaft during the transient stopping interval.

8. A step-by-step drive system for enabling incremental reading of successive frames of data on a web member comprising single drive capstan means in constant nonsliding engagement with the web member, means associated with the web member for reproducing the individual data frames from the member, motive means coupled directly to the capstan, the motive means having a known acceleration characteristic for an applied energizing signal, pulse means coupled to the motive means, the pulse means accelerating the motive means over a variable incremental distance related to the position of a data frame on the web member, and pulse means responsive to the reproduction of a data frame for energizing the motive means with a deceleration pulse.

9. A tape transport system for digital applications comprising the tape, a capstan continuously engaging the tape, a motor directly coupled to the capstan, the motor having an acceleration characteristic which is proportional to the driving current, and current control means for operating the motor, the current control means providing selected current waveforms during acceleration and deceleration intervals.

10. A system for controlling the operation of an intermittently actuable motor for programmed rotation comprising a drive motor having a torque characteristic which increases with current over a substantial range, drive amplifier means coupled to the motor, tachometer means providing a speed-sensing signal coupled to the motor and responsive thereto, servoamplifier means responsive to an input reference signal and speed-sensing signal, the servoamplifier means being coupled to operate the drive amplifier means, means for enabling the servoamplifier means in response to off and on commands, means for providing forward reference signals to the servoamplifier means in response to forward commands, and means responsive to transition states in the operation of the servoamplifier means for generating energizing pulses, the energizing pulses being coupled to the motor.

11. A motor drive system comprising a motor having an output torque substantially proportional to the input current applied, a saturable amplifier means coupled to drive the motor in two distinct operating ranges and having a linear transfer characteristic for input signals below a selected level, means for providing a signal voltage to the saturable amplifier means proportional to the difference between the actual motor speed and a desired motor speed, and means for operating said saturable amplifier means above said selected level except when the actual motor speed is within a predetermined range of said desired motor speed.

12. A motor drive system comprising a power amplifier for providing a substantially constant current to the motor in response to an applied input signal above a predetermined magnitude, means for sensing the actual motor speed to provide a negative feedback signal to the amplifier to reduce the magnitude of the applied input signal, and command means for providing command signals to the amplifier indicative of desired motor speeds, the signal applied to the amplifier being proportional to the difference between the desired motor speed and the actual motor speed over a predetermined range, said command means including means for generating regulated command signals in response to applied unregulated control signals.